US011164233B2

(12) United States Patent
Clayton et al.

(10) Patent No.: US 11,164,233 B2
(45) Date of Patent: Nov. 2, 2021

(54) COMPUTER SYSTEM FOR FILTERING AND MATCHING GARMENTS WITH USERS

(71) Applicant: Savitude, Inc., Palo Alto, CA (US)

(72) Inventors: Nicholas Daniel Clayton, Ann Arbor, MI (US); Camilla Marie Olson, Palo Alto, CA (US); Kelli Tomie Howard, Saratoga, CA (US); Jungah Joo Lee, Sunnyvale, CA (US)

(73) Assignee: SAVITUDE, INC., Palo Alto, CA (US)

( * ) Notice: Subject to any disclaimer, the term of this patent is extended or adjusted under 35 U.S.C. 154(b) by 201 days.

(21) Appl. No.: 15/980,493

(22) Filed: May 15, 2018

(65) Prior Publication Data

US 2018/0330423 A1   Nov. 15, 2018

Related U.S. Application Data

(60) Provisional application No. 62/506,408, filed on May 15, 2017.

(51) Int. Cl.
*G06Q 30/00* (2012.01)
*G06Q 30/06* (2012.01)
*G06F 16/954* (2019.01)
*G06F 16/9535* (2019.01)

(52) U.S. Cl.
CPC ....... *G06Q 30/0631* (2013.01); *G06F 16/954* (2019.01); *G06F 16/9535* (2019.01); *G06Q 30/0643* (2013.01)

(58) Field of Classification Search
CPC .................................................... G06Q 30/00
See application file for complete search history.

(56) References Cited

U.S. PATENT DOCUMENTS

| 10,157,351 | B1* | 12/2018 | Rastogi | G06N 7/005 |
|---|---|---|---|---|
| 2005/0256759 | A1* | 11/2005 | Acharya | G06Q 30/0202 |
| | | | | 705/7.31 |
| 2009/0164274 | A1* | 6/2009 | Narayanaswamy | G06Q 10/10 |
| | | | | 705/70 |
| 2011/0022965 | A1* | 1/2011 | Lawrence | G06F 3/011 |
| | | | | 715/747 |
| 2011/0282758 | A1* | 11/2011 | Jacobi | G06Q 30/0253 |
| | | | | 705/26.7 |
| 2013/0066750 | A1* | 3/2013 | Siddique | G06Q 10/0637 |
| | | | | 705/27.2 |
| 2014/0176565 | A1* | 6/2014 | Adeyoola | G06T 19/006 |
| | | | | 345/473 |
| 2015/0134413 | A1* | 5/2015 | Deshpande | G06Q 30/0202 |
| | | | | 705/7.31 |

(Continued)

OTHER PUBLICATIONS

Suchacka, Grazyna, "Using association rules to assess purchase probability in online stores", Information Systems and e-business Management, dated Sep. 6, 2016. (Year: 2016).*

(Continued)

*Primary Examiner* — Mark A Fadok
(74) *Attorney, Agent, or Firm* — Haynes & Boone, LLP

(57) ABSTRACT

A computing system comprising a database of users, a database of garments, and a database of mappings, wherein a mapping maps one or more users of the database of users to one or more garments of the database of garments and wherein each mapping includes a weight for its corresponding user-garment pair.

10 Claims, 1 Drawing Sheet

Which of these images best represents your shoulders?

Which of these images best represents your body proportion (torso)?

Type/select your height.

(56) References Cited

U.S. PATENT DOCUMENTS

| | | | | |
|---|---|---|---|---|
| 2016/0019626 | A1* | 1/2016 | Pham | G06Q 30/0631 |
| | | | | 705/26.7 |
| 2016/0042428 | A1* | 2/2016 | Gou | G06Q 30/0631 |
| | | | | 705/26.7 |
| 2016/0203525 | A1* | 7/2016 | Hara | G06K 9/6277 |
| | | | | 705/14.56 |
| 2016/0275594 | A1* | 9/2016 | Mullakkara Azhuvath | |
| | | | | G06F 16/248 |
| 2017/0039622 | A1* | 2/2017 | Chen | G06Q 30/0201 |
| 2017/0116530 | A1* | 4/2017 | Modarresi | G06Q 10/067 |
| 2017/0124624 | A1* | 5/2017 | Agrawal | G06Q 30/0201 |
| 2017/0148084 | A1* | 5/2017 | Axelsson | G06F 7/026 |
| 2017/0221125 | A1* | 8/2017 | Leong | G06F 16/24 |
| 2017/0278172 | A1* | 9/2017 | Dey | G06Q 30/0633 |
| 2017/0293962 | A1* | 10/2017 | Sekhon | G06Q 30/0631 |
| 2018/0012110 | A1* | 1/2018 | Souche | G06F 16/58 |
| 2019/0205938 | A1* | 7/2019 | Van Winkle | G06Q 30/0255 |

OTHER PUBLICATIONS

Lumen, "Constructing Probability Models", Lumenleraning.com, dated: Jun. 28, 2014. (Year: 2014).*

Kumar-Dey, Emon, An automated system for garment texture design class identification, Computers; dated Jun. 15, 2015. (Year: 2015).*

Kalantidis, Yannis, Getting the Look: Clothing recognition and segmentation for automatic product suggestions in everyday photos; researchgate.net, dates Apr. 2013. (Year: 2013).*

* cited by examiner

Which of these images best represents your shoulders?
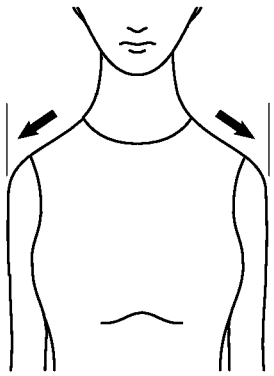 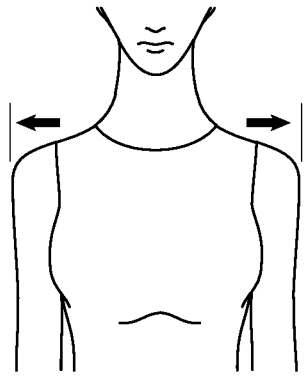 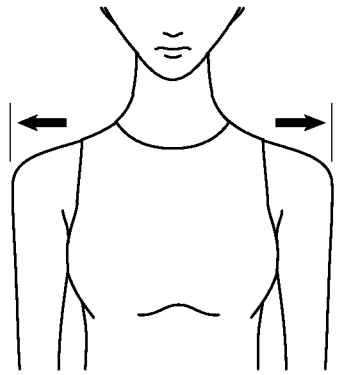
Which of these images best represents your body proportion (torso)?
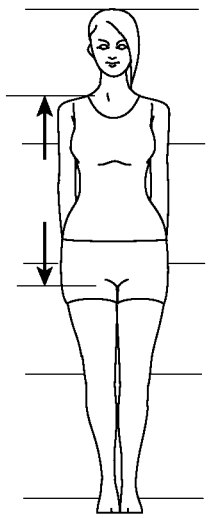 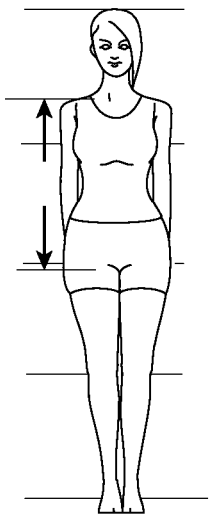 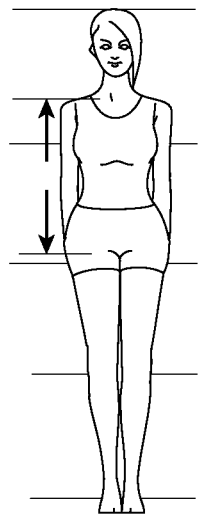
Type/select your height.
Nothing selected ▼

COMPUTER SYSTEM FOR FILTERING AND MATCHING GARMENTS WITH USERS

FIELD OF THE INVENTION

The present disclosure generally relates to computer database systems. The disclosure relates more particularly to apparatus and techniques for performing filtering and searching garment databases for matching users with garments where the number of garments represented would be impractical to review entirely and/or for filtering out some of the garments as being undesirable or a poor fit for the user.

CROSS-REFERENCE TO RELATED APPLICATIONS

This application claims benefit of, and is a non-provisional of, U.S. Provisional Patent Application No. 62/506,408, filed May 15, 2017 entitled "Computer System for Filtering and Matching Garments with Users".

BACKGROUND

The present disclosure relates to matching user records in a user database with garment records in a garment database, but might generalize to other domains wherein databases with large numbers of records need to be filtered, sorted and matched in an efficient manner. Such a system might find use as a backend server or service for an online service that identifies for users suitable garments or accessories where the number of possible garments or accessories is large enough that filtering is required in order to make the server or service useful. The utility of a server or service might be determined based on how well it filters data, how long it takes to compute a response for a user, and other requirements.

SUMMARY

A computer system having a database of users, a database of garments, and a database of mappings receives information containing a user interaction with a garment and updates a mapping in the database based on the user interaction. The mappings in the database map one or more users of the database of users to one or more garments of the database of garments. Each mapping includes a weight for its corresponding user-garment pair. The database of users may contain features of the users and the database of garments may contain features of the garments. A plurality of interactions with a garment by a plurality of users having similar features may be used to predict a feature of the garment. The database of mappings may be used to predict, based on a plurality of users having a similar feature, a probability that a user having that similar feature is to interact with a garment. The garments may be filtered by the feature and the garment presented to a user based on a probability of the garment having the feature. The database of mappings may be used to calculate a probability of a user interacting with a garment based on the mapping. The database of mappings may also be used to calculate a model that calculates a probability of a user interacting with a garment. The model may be updated using one of a moving average model, a regression model, and a RANSAC model. The weights may be presented to an evaluator for tuning.

In another embodiment, a method of receiving information containing a user interaction with a garment, updating a mapping of users in a database of users to garments in a database of garments, and calculating a probability of a user interacting with a garment based on the mapping is disclosed.

In another embodiment, a non-transitory computer-readable storage medium having stored thereon executable instructions that, when executed by one or more processors of a computer system, cause the computer system to receive user-garment interaction information, update a weight in a user-garment mapping, and calculate a probability of a user interacting with a garment based on the mapping is disclosed.

FIGURES

FIG. 1 illustrates some examples of questions and how they are presented to the user.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

In one embodiment, a server maintains several databases, or provides access to them, and responds to queries from client devices and systems. A client device might be a computer with a browser and an Internet connection that a user might use to access information available from the server. The server also includes program code to process data from the client devices and systems and from various databases to implement program functionality. Some such functionality includes:

- maintaining a database of users, with a user record per user that contains details of the user
- maintaining a database of garments, which should be understood to extend to accessories and other items that might be worn or carried by users, with a garment record per garment that contains qualitative details of the garment identified in that garment record
- maintaining a mapping database, comprising a plurality of mapping records wherein a mapping record includes data to (1) associate a user or multiple users with (2) a garment or multiple garments, and (3) a weight for the user-garment association to which the mapping record refers
- program code to filter and present garments from garment records selected per a selection process, where presenting might be sending web pages or information to a client device
- program code to update the databases

User Database

A user database is provided. A user record might include contact information for the user, but might also include geographic location, age or profession. In addition to quantitative data about the user, the user record might also include relative data and qualitative data. This data might be supplied by the user, but might be obtain in other ways as well.

Relative data might indicate relationships between other data. For example, a ratio between two numbers might be relative data. For example, ratio of torso to leg inseam would be relative data. The relative data and quantitative data (and may be also the qualitative data) might be represented at full resolution, but also or instead might be represented by "binned" data representing less resolution or more grouping of values. As an example, a user record might include height data (e.g., 175 cm, 5' 4", 6' 2.5") and/or binned height (e.g., A through E, where A is for less than 4' 6", B is for 4' 6" to 5' 3", C is for 5' 3" to 5' 10", D is for 5' 10" to 6' 3" and E is for greater than 6' 3").

Examples of data that might be included in a user record are the user's body shape, perhaps selected from among a standardized set of nine body shapes. In the general case, body shape is an enumerated value and other enumerated values might be present in a user record.

The data can be obtained from the user in a number of ways. Quantitative data might be obtained by asking the user to make body measurements, having the user input those into their client device (such as a smartphone, tablet, laptop, computer, etc.) and the server record those into the user record. The user may also answer questions in a store provided device, such as a kiosk or tablet. Other types of data might similarly be obtained.

Another method of data collection, such as for relative data and qualitative data, is to show the user a series of images and ask them to select the images that are most like them. For example, a user might be shown several pictures of persons with different torso/inseam ratios and asked to pick one or more that the user feels is an image of a person having the same relative data item as the user. This can provide for more robust data collection, as a user might not know their inseam and torso length, or be able to measure it accurately and correctly, but they might be able to more easily look at a set of images representative of each bin for torso/inseam ratio and pick the one or more images from the set of images that most resembles the user. By binning descriptors, the server can more easily make reasonable judgments about the user without having to create an unreasonable number of entries and allows users to be grouped into their relevant demographics more meaningfully.

Yet another method is to have the server send the client device a display of a set of questions that are asked of the user. For example, a website with radio buttons and other input fields might be presented to the user to obtain the user's answers.

FIG. 1 illustrates some examples of questions and how they are presented to the user. The user might be asked a series of qualitative questions (e.g., answering general questions or asking to identify features from examples), relative questions (e.g., selecting from images showing different ratios of particular measurements or inputting the user's ratio), and quantitative questions asking for particular values.

In response to the user's data input (measurements, answers to questions, etc.), the server can populate various fields of data for the user record. Qualitative fields might be more easily classifiable from the user perspective, as they do not require users to know specific measurements about themselves, or be less willing and able to provide that information. Many users might not have access to the requisite tools (such as a measuring tape) nor do many users know how to accurately apply those tools, even should they have access. Thus, instead of asking for features such as the circumference of their waist, the user might be asked about relative features such as the length of their legs compared with the length of their torso. While this feature could be found by measuring a user's inseam and torso and calculating the ratio, it might provide more complete and/or robust data to ask the user to select among images representing the various bins.

Much the same is true of garments, while a vendor may have a variety of data about their garments it is unlikely that they have all of the features that we are interested in noted. Because the features are qualitative we can compare images of the garments to models of each of the possible values and select the value that best matches the garment. Supervised image classification may be used to provide garment descriptor vectors for qualitative features. Quantitative features may be provided by the dimensions of the garment.

Some set of the data items present in the user record can be considered descriptors and a plurality of descriptors can represent a descriptor vector for that user, i.e., where each field, column, etc. of the user record corresponds to a dimension and the value in that field, column, etc. of a given user record is the vector component value for that user record and that dimension. Table 1 illustrates an example of some descriptor dimensions that might be used.

TABLE 1

Descriptor Dimensions for User Records

| Name | Description |
| --- | --- |
| Bodyshape | One of nine body shapes |
| Relative Torso Proportion | Torso length compared to legs, binned into three categories (~average, shorter than average, longer than average) |
| Shoulder Width | Binned into three categories (broad, narrow, average) |
| Relative Weight | Binned into three categories |
| Height | Binned into three categories |

From the user record data, users can be grouped or filtered in different ways. From a user record, the server can filter users demographically, using conventional demographics, such as selecting based on geographic region as specified in the users' contact information fields. The server can also filter users demographically based on their descriptor vector. For example, a server might be compiling recommendations to send to the user's client device. To do so, the server searches the user database for user records having descriptor vectors that are similar to the user's descriptor vector. These descriptor vectors might be stored in a pre-computed fashion, or might be computed on-the-fly. For each pair of the user with another user in the user database, a "distance" between the two users' descriptor vectors might be calculated and a group determined of such users with distances within a threshold.

From that group of "similar" users (with similarity determined by vector difference), the server considers a past purchase history of the group of users and scores purchased items based on the number of other users in the group who have history with that item as well as the type of interaction history those users have (e.g., purchased, liked, viewed, or other product interaction) to find items that would be shown to the user. The different items might be weighted based on the vector distances, so that another user with a more similar descriptor is given a higher weight and less similar users.

For the descriptor vectors, the dimensions might all be highly relevant to the recommendations being made and the values binned into the most relevant categories, so that groupings are meaningful, while not eliminating users based on meaningless differences (such as being 5' 1" vs. 5' 2"). This is particularly helpful when making recommendations with smaller numbers of users.

Garment Database

A garment database is provided, containing garment records. A garment record might include details of a particular garment, including quantitative data, relative data and qualitative data. This data might be supplied by a garment manufacturer, but might be obtain in other ways as well.

Examples of data that might be included in a garment record are the style, type, color, etc. Some data might be binned values, and qualitative enumerated values. A vendor may have a variety of data about their garments and may provide the necessary qualitative values for the garments they provide. Where the features are qualitative, a reviewer might easily compare images of garments to models to designate the qualitative values for a garment. In this manner, supervised image classification can be used to populate the garment database and provide garment descriptor vectors. Some set of the data items present in the garment record can be considered descriptors and a plurality of descriptors can represent a descriptor vector for that garment.

As with user records, garment records can be grouped or filtered in different ways, such as by using garment descriptor vectors. These descriptor vectors might be stored in a pre-computed fashion, or might be computed on-the-fly.

The garment database might have fields for shape, such as "a-line" and other shapes, and field for features, such as "v-neck" and other features. In general, a garment record in the garment database might represent a garment largely using qualitative fields. This may allow the garment record to be classifiable by an automated process. This qualitative data for garments can be combined with a supervised image classification process, by generating a descriptor vector for a garment that represents its visual classification.

Filtering the garments data for a user is useful. For one, filtering and searching the garment database might reduce the number of garments that the user needs to consider. Another useful feature is filtering out garments that can be determined, based on their data elements and data representing characteristics of the user, to likely be undesirable or a poor fit for that user.

Mappings Database

The server maintains a model of users, garments and mappings. User interactions (such as purchases, adding to a shopping cart, liking, viewings, or other product interactions) can be used to update a weighted model of generic user preference based on the users and garments' or other items' features. This weighted model can be applied in a weighted manner, with weights updated based on user behavior where a user with a particular trait interaction with a garment with a particular trait would increase the model's preference for that intersection of traits. The weights may correspond to the probability that a user has a particular feature and that a garment has a particular feature. Different interactions may be weighted the same or differently. For example, a purchase of a product may be more heavily weighted than adding a product to a cart. Updating the model based on garments and users allows the server to access the model in constant time to evaluate a particular user and item based on their features, even if neither the user nor the item has any purchase history. In some embodiments, the weights may be used to calculate the probability of a particular user interacting with a particular garment.

The user database, the garment database, and the mappings database can be used as a knowledge base that provides essentially a weighted map between users and garments. For a user-garment pair, there can be a weighted value. This weighted value might be based on fashion expert inputs. Each weighted value might be a numerical value, not necessarily an integer value, and also have values representing −infinity (never make this mapping) and +infinity (always make this mapping), where 0 represents a neutral weight.

Garments can be scored for each user based on the sum of the weights that apply to them. For a user a garment with a neutral or better score, those can be shown to the user, while those scoring below neutral are discarded. The mapping data might be updated based on user-garment interaction data. For example, interaction data may include purchases, adding a garment to a shopping cart, liking a garment, viewings of a garment, or other product interactions. Different types of interactions may be scored differently. With this scoring structure, filtering and other processes would have an advantage in that a particular pairing of user and garment can be evaluated in constant time, allowing a set of garments to be generated for a user in $O(n)$ time, where n is the number of garments, whereas other approaches typically run in $O(n*m)$ or worse time, where m is the number of users.

User-garment models can be trained to predict outcomes based on the user-garment data. The models can be used alone or combined with a subject matter expert model. In one embodiment, a regression or RANSAC model may be used to train a user-garment model to predict which garments are most likely to cause user interaction (e.g., purchases, adding to a shopping cart, liking, viewings, or other product interactions). In this embodiment, the weights of the knowledge base (the user database, the garment database, and the mappings) are periodically optimized to best fit user actions. This approach works both for predicting if a user will interact in a specific way with a garment (e.g., will the user add the product to a shopping cart from the product page) or at a more general level of "does the user like this" which may be tested with a question on a product page or in a survey. In an example where the model is being trained to predict a specific action such as adding a product to a shopping cart, only similar interactions may be used. A model that predicts adding a garment to a shopping cart may only give weight to interactions where a garment was added to a shopping cart. Alternatively, all interactions could be used but weighted differently. Adding to a shopping cart might count for the highest weight with purchasing adding less weight but still positive. Some interactions may be weighted negatively, such as a user momentarily viewing but quickly leaving a product page. Alternatively, such interactions may still be positive but slightly so.

In a more general case, a weight could be assigned to each type of interaction based on the significance of the interaction. For example, decreasing weights could be used for purchases, adding to a shopping cart, liking, and viewing. In predicting whether a particular shape of user likes a particular shape of garment, a purchase of a similarly shaped garment would be a strong positive indicator while a momentary view of a product page with no interaction would be a weak negative weight indicating the user did not like the shape corresponding to the garment shown. In other models, it may be a weakly positive form of interaction. In a simplified embodiment, all weights may be the same, regardless of how much product interaction there was.

Regardless of how the weights are derived, a weighted regression or weighted RANSAC may be used to find the best-fit model to predict user interaction. This enables retailers to present garments or products to users that have the best fit or possibly advise a user if other users having similar features to the user did not have a lot of interaction with the garment or product.

In instances where faster access to the data such as live or almost instantaneous access is desired, a moving average filter may be used. This model may also be useful if a less computationally complex model is desired. An exponentially weighted moving average filter may be less computationally expensive than other methods, such as the RANSAC or regression methods described above. The moving average filter may also respond to new trends more quickly. This may or may not be desirable, depending on how important identifying trends is and how costly false positives are. Similar to the above embodiment, weights may be used for more or less significant interactions. For each user interaction with a product, all weights impacting the prediction of that interaction may be updated as follows:

$$weight_{new} = weight_{current} * \left(1 - \frac{\text{significance}}{N}\right) + \frac{\text{significance}}{N} * sign$$

where $weight_{new}$ is the new weight after the interaction, $weight_{current}$ is the weight before the interaction, significance is a number between 0 and 1 corresponding to strength of interaction, N determines the responsiveness to new data where larger N represents using a longer tail (less responsive to new data), and sign is positive unity (+1) or negative unity (−1) depending on the positivity or negativity of the interaction. For example, a purchase may have a higher significance value (for example, 0.9) than a page view (for example, 0.1). A return may have a negative value for sign. In some embodiments, a momentary page view followed by immediately leaving the page, indicating dislike of the product, may have a negative sign.

After Regression, RANSAC, weighted moving average, or another technique generates a model, an evaluator, such as a subject matter expert, may tune or evaluate the weights and other aspects of the model.

Server Processes

For each dimension of a garment descriptor, the server might maintain a classifier. Taking, for example, a descriptor of boots that has three possible values (ankle, calf, and high), an image classification process might be passed a set of images having known values, e.g., a set of images of ankle boots, a set of images of calf boots and a set of images of high boots. For each of these sets, a model of the type of image is created. When a new boot is added to the garment database, images of the new boot are evaluated with each of the models for ankle, calf, and high and the new boots' value on that dimension is determined by which model they best fit. This process can be applied to each dimension of the descriptor to generate a complete descriptor vector. Where descriptors are both qualitative and contain a finite set of discrete possibilities, a classifier can easily be used for each dimension.

A computer system implementing the server can manage large numbers of users and large numbers of garments while learning how to present the most promising garments from a garments database to users. This might be useful in the context of an online store, where users are able to find garments that work for them.

A user's height can be binned and the bin can be used for demographic filtering to perhaps provide a user with an indication of actions/behaviors of their subset of users, such as indicating that "other users in your bin/category bought or liked X." In addition to user's height, the demographic filtering can be done on other body descriptors, such as body shape.

The user's purchase history and the user's height bin/category can be used to select a subset of other users and present the first user with suggestions, or information about, purchases made by others in the selected subset and exclude purchases outside the selected subset. Other body descriptors can be used as well.

Demographic filtering might be used in the following manner. Consider if the server was tasked with the process of "pick out all the extra tall people and when they are shopping for products, show them this particular brand of suit, but for the petites, do not show them that brand of suit." This would be but one example of demographic filtering.

In a process supported by the server, user purchases are used to update a weighted model of generic user preference. This allows for modeling, in constant time, and evaluating a particular user and item, even where neither the user nor the item have any purchase history.

Example Hardware

According to one embodiment, the techniques described herein are implemented by one or generalized computing systems programmed to perform the techniques pursuant to program instructions in firmware, memory, other storage, or a combination. Special-purpose computing devices may be used, such as desktop computer systems, portable computer systems, handheld devices, networking devices or any other device that incorporates hard-wired and/or program logic to implement the techniques.

For example, a computer system might include a bus or other communication mechanism for communicating information, and a processor coupled with the bus for processing information and the processor may be, for example, a general purpose microprocessor. The computer system also includes a main memory, such as a random access memory (RAM) or other dynamic storage device, coupled to the bus for storing information and instructions to be executed by the processor. The main memory also may be used for storing temporary variables or other intermediate information during execution of instructions to be executed by the processor. Such instructions, when stored in non-transitory storage media accessible to the processor, render the computer system into a special-purpose machine that is customized to perform the operations specified in the instructions.

The computer system further includes a read only memory (ROM) or other static storage device coupled to the bus for storing static information and instructions for the processor. A storage device, such as a magnetic disk or optical disk, is provided and coupled to the bus for storing information and instructions.

The computer system may be coupled via the bus to a display, such as a computer monitor, for displaying information to a computer user. An input device, including alphanumeric and other keys, is coupled to the bus for communicating information and command selections to the processor. Another type of user input device is a cursor control device, such as a mouse, a trackball, or cursor direction keys for communicating direction information and command selections to the processor and for controlling cursor movement on the display. This input device typically has two degrees of freedom in two axes, a first axis (e.g., x) and a second axis (e.g., y), that allows the device to specify positions in a plane.

The computer system may implement the techniques described herein using customized hard-wired logic, one or more ASICs or FPGAs, firmware and/or program logic which in combination with the computer system causes or programs the computer system to be a special-purpose machine. According to one embodiment, the techniques herein are performed by the computer system in response to the processor executing one or more sequences of one or more instructions contained in the main memory. Such instructions may be read into the main memory from another storage medium, such as a storage device. Execution of the sequences of instructions contained in the main memory causes the processor to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as the storage device. Volatile media includes dynamic memory, such as the main memory. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, an EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise the bus. Transmission media can also take the form of acoustic or light waves, such as those generated during radio-wave and infra-red data communications.

Various forms of media may be involved in carrying one or more sequences of one or more instructions to the processor for execution. For example, the instructions may initially be carried on a magnetic disk or solid state drive of a remote computer. The remote computer can load the instructions into its dynamic memory and send the instructions over a network connection. A modem or network interface local to the computer system can receive the data. The bus carries the data to the main memory, from which the processor retrieves and executes the instructions. The instructions received by the main memory may optionally be stored on the storage device either before or after execution by the processor.

The computer system also includes a communication interface coupled to the bus. The communication interface provides a two-way data communication coupling to a network link that is connected to a local network. For example, the communication interface may be an integrated services digital network (ISDN) card, cable modem, satellite modem, or a modem to provide a data communication connection to a corresponding type of telephone line. Wireless links may also be implemented. In any such implementation, the communication interface sends and receives electrical, electromagnetic or optical signals that carry digital data streams representing various types of information.

A network link typically provides data communication through one or more networks to other data devices. For example, the network link may provide a connection through a local network to a host computer or to data equipment. The local network may use electrical, electromagnetic or optical signals that carry digital data streams. The signals through the various networks and the signals on the network link and through the communication interface, which carry the digital data to and from the computer system, are example forms of transmission media.

The computer system can send messages and receive data, including program code, through the network(s), the network link and the communication interface. A server might transmit a requested code for an application program. The received code may be executed by the processor as it is received, and/or stored in the storage device, or other non-volatile storage for later execution.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Further embodiments can be envisioned to one of ordinary skill in the art after reading this disclosure. In other embodiments, combinations or sub-combinations of the above-disclosed invention can be advantageously made. The example arrangements of components are shown for purposes of illustration and it should be understood that combinations, additions, re-arrangements, and the like are contemplated in alternative embodiments of the present invention. Thus, while the invention has been described with respect to exemplary embodiments, one skilled in the art will recognize that numerous modifications are possible.

For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

All references, including publications, patent applications, and patents, cited herein are hereby incorporated by reference to the same extent as if each reference were individually and specifically indicated to be incorporated by reference and were set forth in its entirety herein.

What is claimed is:

1. A computing system comprising:
   a database of users, wherein the database of users contains data about user features of users;
   a database of garments;
   a database of mappings, wherein a mapping maps one or more users of the database of users to one or more garments of the database of garments and wherein each mapping includes a weight for its corresponding user-garment pair, wherein the database of mappings is used to calculate a model which calculates a probability of a user interacting with a garment; and
   a processor configured to:
   a) receive information containing a user interaction with a garment, wherein the user interaction comprises the user viewing a product page, and wherein the information containing the user interaction comprises an amount of time that the user viewed the product page;
   b) update a weight of a mapping in the database of mappings based on the user interaction, wherein updating the mapping in the database of mappings is in response to the receipt of the information containing the user interaction;
   c) update the model using a moving average filter;
   d) present another garment to the user, wherein the another garment is selected from the database of garments using the database of mappings and based on the amount of time that the user viewed the product page;
   wherein the user interaction with the garment is one of a plurality of interactions with the garment by a plurality of users having similar user features;
   e) predict, using the plurality of interactions with the garment, a qualitative feature of the garment;
   f) produce a descriptor vector for the garment that represents its visual classification by combining the predicted qualitative feature and a supervised image classification; and
   g) update the database of garments to include the descriptor vector for the garment.

2. The system of claim 1, wherein the database of mappings is used to predict, based on a plurality of users having a similar feature, a probability that a user having that similar feature is to interact with a garment.

3. The system of claim 1, wherein garments are filtered by the feature and the garment is presented to a user based on a probability of the garment having the feature.

4. The system of claim 1, wherein the database of mappings is used to calculate a probability of a user interacting with a garment based on the mapping.

5. The computing system of claim 1, wherein the weights are presented to an evaluator for tuning.

6. A method comprising:
   creating a model of user-garment interaction based on a mapping of one or more users in a database of users, wherein the database of users contains data about user features of users, to one or more garments in a database of garments, comprising:
   receiving information containing a user interaction with a garment, wherein the user interaction comprises the user viewing a product page, and wherein the information containing the user interaction comprises an amount of time that the user viewed the product page;
   updating the mapping in response to the information containing the user interaction, wherein the mapping is in a database of mappings and wherein the database of mappings is used to calculate the model which calculates a probability of a user interacting with a garment;
   calculating, using the model, a probability of a user interacting with a garment based on the mapping, wherein the model is updated using a moving average filter;
   presenting another garment to the user, wherein the another garment is selected from the database of garments using the database of mappings and based on the amount of time that the user viewed the product page;
   wherein the user interaction with the garment is one of a plurality of interactions with the garment by a plurality of users having similar user features;
   predicting, using the plurality of interactions with the garment, a qualitative feature of the garment;
   producing a descriptor vector for the garment that represents its visual classification by combining the predicted qualitative feature and a supervised image classification; and
   updating the database of garments to include the descriptor vector for the garment.

7. The method of claim 6, wherein the database of mappings is used to predict, based on a plurality of users having a similar feature, a probability that a user having that similar feature is to interact with a garment.

8. A non-transitory computer-readable storage medium having stored thereon executable instructions that, when executed by one or more processors of a computer system, cause the computer system to at least:
   receive user-garment interaction information,
      wherein the user-garment interaction information is based on a user viewing a product page, and
      wherein the user-garment interaction information is further based on an amount of time that the user viewed the product page;
   update a weight in a user-garment mapping in response to the user-garment interaction information,
      wherein the mapping is in a database of mappings;
      wherein the user-garment mapping maps one or more users in a database of users to one or more garments in a database of garments, and wherein the database of users contains data about user features of users; and
      wherein the database of mappings is used to calculate a model which calculates a probability of a user interacting with a garment;
   calculate, using the model, a probability of a user interacting with a garment based on the mapping, wherein the model is updated using a moving average filter:,
   present another garment to the user, wherein the another garment is selected a plurality of garments using the user-garment mapping and based on the amount of time that the user viewed the product page;

wherein the user interaction with the garment is one of a plurality of interactions with the garment by a plurality of users having similar user features;
predict, using the plurality of interactions with the garment, a qualitative feature of the garment;
produce a descriptor vector for the garment that represents its visual classification by combining the predicted qualitative feature and a supervised image classification; and
update the database of garments to include the descriptor vector for the garment.

9. The computer readable storage medium of claim 8, wherein the database of mappings is used to predict, based on a plurality of users having a similar feature, a probability that a user having that similar feature is to interact with a garment.

10. The computer readable storage medium of claim 8, wherein the model is further presented for tuning by an evaluator.

* * * * *